US012512117B2

(12) United States Patent
Sibuet

(10) Patent No.: US 12,512,117 B2
(45) Date of Patent: Dec. 30, 2025

(54) COMMUNICATION ASSEMBLY, AIRCRAFT PROVIDED WITH THE COMMUNICATION ASSEMBLY AND METHOD FOR PREVENTING INTERFERENCE IN COMMUNICATIONS

(71) Applicant: SAFRAN AEROSYSTEMS, Plaisir (FR)

(72) Inventor: Jean-Philippe Sibuet, Moissy-Cramayel (FR)

(73) Assignee: SAFRAN AEROSYSTEMS, Plaisir (FR)

(*) Notice: Subject to any disclaimer, the term of this patent is extended or adjusted under 35 U.S.C. 154(b) by 347 days.

(21) Appl. No.: 18/250,441

(22) PCT Filed: Oct. 12, 2021

(86) PCT No.: PCT/FR2021/051773
§ 371 (c)(1),
(2) Date: Apr. 25, 2023

(87) PCT Pub. No.: WO2022/090641
PCT Pub. Date: May 5, 2022

(65) Prior Publication Data

US 2023/0410836 A1 Dec. 21, 2023

(30) Foreign Application Priority Data

Oct. 27, 2020 (FR) ...................................... 2011006

(51) Int. Cl.
*G10L 25/84* (2013.01)
*A62B 7/14* (2006.01)
(Continued)

(52) U.S. Cl.
CPC ................ *G10L 25/84* (2013.01); *A62B 7/14* (2013.01); *A62B 27/00* (2013.01); *G10L 21/0232* (2013.01)

(58) Field of Classification Search
CPC . G10L 25/84; G10L 21/0232; G10L 21/0208; G10L 2021/03643; A62B 7/14; A62B 27/00; A62B 25/005; A62B 18/08
See application file for complete search history.

(56) References Cited

U.S. PATENT DOCUMENTS 10,561,863 B1 * 2/2020 Dashevsky .............. A62B 7/14
10,786,693 B1 * 9/2020 Opperman ............ A62B 18/02
(Continued)

FOREIGN PATENT DOCUMENTS

EP 3417913 A1 12/2018
WO WO 2008081226 A1 7/2008

OTHER PUBLICATIONS

English translation of International Patent Application No. PCT/FR2021/051773 International Search Report dated Jan. 24, 2022, 2 pages.

*Primary Examiner* — Richemond Dorvil
*Assistant Examiner* — Zeeshan Mahmood Shaikh
(74) *Attorney, Agent, or Firm* — Cozen O'Connor

(57) ABSTRACT

A communication assembly for avoiding interferences due to oxygen flow noise, including a) a breathing mask having a body having a face shell having a breathing cavity and a regulator delivering a breathing gas, b) a microphone configured to capture a sound signal in the breathing cavity, c) a test button for supplying the breathing cavity with breathing gas, d) an attenuation device, e) a sound monitoring system, f) a controller configured to the attenuation device operate in an active mode when a flow noise though the breathing cavity during inhalation by the user is detected, and an inactive mode when a vocal sound or a flow noise in
(Continued)

the breathing cavity in a stowed configuration is detected, and g) a transmitter for transmitting an output signal.

14 Claims, 5 Drawing Sheets

(51) Int. Cl.
*A62B 27/00* (2006.01)
*G10L 21/0232* (2013.01)

(56) References Cited

U.S. PATENT DOCUMENTS

| | | | | |
|---|---|---|---|---|
| 2005/0145245 | A1* | 7/2005 | Jordan | B64D 10/00 128/202.11 |
| 2010/0108065 | A1* | 5/2010 | Zimmerman | A62B 18/08 128/204.23 |
| 2014/0261405 | A1* | 9/2014 | Tekelenburg | A62B 9/02 128/201.19 |
| 2018/0361179 | A1* | 12/2018 | Sibuet | A62B 27/00 |
| 2019/0053769 | A1* | 2/2019 | O'Keeffe | A63B 23/185 |
| 2020/0306568 | A1* | 10/2020 | Kliem | A62B 18/02 |

* cited by examiner

COMMUNICATION ASSEMBLY, AIRCRAFT PROVIDED WITH THE COMMUNICATION ASSEMBLY AND METHOD FOR PREVENTING INTERFERENCE IN COMMUNICATIONS

CROSS-REFERENCE TO RELATED APPLICATIONS

This application is a U.S. National Stage Filing of PCT/FR2021/051773 filed Oct. 12, 2021, and French Patent Application No. 2011006 filed Oct. 27, 2020, 2021, and titled "Communication Assembly, Aircraft provided with the Communication Assembly and method for preventing Interference in Communications," the entirety of which are incorporated by reference.

FIELD OF THE DISCLOSURE

The present disclosure relates to a communication assembly comprising a breathing mask equipped with a microphone, as well as an aircraft equipped with the communication assembly and a method, the assembly and the method being intended to avoid interferences due to the oxygen flow noise in communications between a user, an aircrew member, and another aircrew member or between the aircraft user and a control tower. In particular, the user is a pilot or a co-pilot.

CONTEXT OF THE DISCLOSURE

Most aircrafts are equipped with breathing mask systems to supply oxygen to crew members for use in emergency situations, such as in oxygen-depleted environments during decompression of the aircraft. During these emergency operations, pilots, navigation officers, and other members of the crew on-board could wear a breathing mask comprising an on-demand breathing regulator and a microphone. The breathing mask must comprise a microphone so that communication with other crew members or with the control tower personnel, during such an emergency situation, could be maintained.

In most microphone systems, the sounds emitted by the user activate a microphone which converts the received sounds into an audio signal for transmission. The sounds received by the microphone comprise not only the voice of the user but, unfortunately, background noise as well. When the user inhales, the sound of the gas flow coming out of the regulator is often particularly loud and is transmitted as noise having a large component comparable in frequency and intensity to the sounds emitted by a person speaking. When a crew member (piloting or others) wearing a breathing mask talks, the noise generated during inhalation by other crew members can seriously disturb hearing or understanding of the voices of the talking crew member. In addition, when the crew members are exposed to stressful emergency conditions, their breathing rate is increased, which further intensifies the level of noise interference. This interference poses a very serious problem, because it is at such a time of emergency that an effective communication between members of the crew and with the tower is imperative.

In practice, an audio button can be provided to enable the pilot to manually activate the microphone function only when he talks and to cut off the microphone when it is not activated (no audio signal transmitted).

Moreover, it is known, in particular from the document WO2008081226A1, a communication assembly comprising a breathing mask. The breathing mask comprises a regulator delivering a breathing gas during inhalation by the crew member. The oxygen content of the breathing gas depends on the pressure inside the cabin (passenger compartment). Reference is generally made to the cabin altitude which is the "standard" altitude corresponding to the pressure in the cabin (inside the aircraft, where the user is located). Such a breathing mask comprises a shell which is placed on the face, the shell being sealed and applied in a sealed manner on the face of the crew member to prevent any entry, in particular of ambient air, inside the shell other than the breathing gas supplied on demand and with a regulated oxygen content. Thus, any phenomenon of dilution with the cabin air is avoided and the crew member is also protected from any smoke or possible harmful gases.

Due to this sealed design, such a communication assembly comprises a microphone disposed inside the shell and delivers an audio signal to the audio system of the aircraft.

Moreover, the document WO2008081226A1 discloses a communication assembly equipped with a microphone allowing reducing the noise of injection of breathing gas into the shell, the audio signal delivered by the microphone is automatically reduced (attenuated) when a noise corresponding to the injection of oxygen into the shell is detected. In case of voice detection, the audio signal delivered by the microphone is not reduced (not attenuated).

The microphone, called ASM (Active switch microphone), includes a breathing gas injection noise detection and a voice detection. This works perfectly satisfactorily. Nonetheless, compared to the audio button allowing activating the microphone function, this communication assembly has the drawback of complicating the verification of the proper operation of the communication assembly. Indeed, during verification, the breathing mask is generally stored in its storage box and a practice consists in simultaneously verifying the proper operation of the supply of the shell with breathing gas and of the microphone by listening to the breathing gas flow in the shell via the audio system of the aircraft.

A solution allowing overcoming this problem is to provide for an on/off button inhibiting the reduction (attenuation) of the audio signal, even in the case of detection of a breathing gas flow.

STATEMENT OF THE DISCLOSURE

An ergonomic, reliable and robust communication assembly is proposed which allows overcoming at least some of the aforementioned problems.

For this purpose, the communication assembly, intended to avoid interferences due to oxygen flow noise in communications between a user, an aircrew member, and another aircrew member or between the user and a control tower, comprises:

a) a breathing mask including:
   - a body having a face shell having a breathing cavity, said face shell being adapted to be applied on the face of the user in a use configuration in which the breathing cavity is delimited by said face shell and by the face of the user,
   - a regulator including an inlet orifice intended to be connected to an oxygen source and an outlet orifice delivering a breathing gas containing oxygen, the outlet orifice being in flow communication with the breathing cavity for supplying the breathing gas to the user in a flow through the breathing cavity during inhalation by the user, b) a test button for supplying the breathing cavity with breathing gas (in the absence of inhalation by the user) when the communication assembly is in a stowed configuration in which the breathing cavity is not in contact with the face of the user, c) a microphone mounted on the body of the breathing mask, the microphone being configured to capture a sound signal in the breathing cavity and transmit a first electrical signal corresponding to the captured sound signal, d) an attenuation device configured to receive the first electrical signal and operate in at least one first mode or one second mode and transmit a second electrical signal, wherein:

in the first mode, the attenuation device attenuates at least one central frequency band of the first electrical signal, said central frequency band corresponding to a frequency range of the sound signal extending between 500 Hz and 1,500 Hz, and in the second mode, the attenuation device does not attenuate the central frequency band of the first electrical signal;

e) a sound monitoring system comprising:

a first sound monitor configured to monitor the sound signal, detect a first sound intensity in a first frequency range and analyse the first sound intensity to determine whether the first sound intensity is within a first determined level range to detect a flow noise through the breathing cavity during inhalation by the user in the use configuration, and a second sound monitor configured to monitor the sound signal, detect a second sound intensity in a second frequency range and analyse the second sound intensity to determine whether the second sound intensity is within a second determined level range to detect a vocal sound, the second frequency range being distinct from the first frequency range; and f) a controller configured to select the operating mode of the attenuation device, in order to make the attenuation device operate in:

the first mode (i) when the first sound intensity analysed by the first sound monitor is within the first determined level range and (ii) when the second sound intensity analysed by the second sound monitor is not within the second determined level range, and the second mode when the second sound intensity analysed by the second sound monitor is within the second determined level range;

g) a transmitter disposed downstream of the attenuation device for transmitting an output signal to another crew member or an emitter antenna, wherein the communication assembly:

the sound monitoring system is configured to monitor the sound signal, detect a third sound intensity in a third frequency range and analyse the third sound intensity to determine whether the third sound intensity is within a third determined level range to detect a flow noise in the breathing cavity in the to stowed configuration, the third frequency range being distinct from the first frequency range, and the controller is configured not to make the attenuation device operate in the first mode when the third sound intensity is within the third level range.

It has been found that the breathing gas flow in the breathing cavity when the breathing cavity is not closed by a face could be discriminated from the flow in the breathing cavity when the breathing cavity is closed by a face. This discrimination possibility seems to be due to the absorption of sound waves by the face.

This solution has the advantage of reducing the constraints on the user. On the one hand, this solution avoids requiring the pilot to press a button each time he speaks in order to be heard. On the other hand, this solution avoids that the button inhibiting the reduction of the audio signal is in a wrong position likely to generate the presence of flow noise interfering with the communications or an erroneous detection of a dysfunction of the communication assembly. Indeed, if the noise reduction function is active when the test button is pressed to check the proper operation of the communication assembly, the flow noise of the breathing gas in the breathing cavity will not be perceived, or to the very least not heard via the audio system of the aircraft.

According to another feature, in the second mode, preferably, the attenuation device does not modify the first electrical signal.

Hence, the second electrical signal is identical to the first electrical signal. Since the sound signal is considered to correspond to words, it is not necessary to modify the first electrical signal.

According to another feature, the controller is preferably configured to make the attenuation device operate in the second mode when the third sound intensity is within the third determined level range.

Since the sound signal is considered to correspond to a flow noise in the breathing cavity in the stowed configuration, the user should hear this noise, just as the words should be heard. Hence, the second mode can be selected both when the second sound intensity analysed by the second monitor is within the second determined level range and when the third sound intensity is within the third determined level range.

According to another feature, the third frequency range extends at least partially above 2,000 Hz, preferably at least partially above 2,500 Hz.

It is found that the third frequency range thus allows detecting a flow noise in the breathing cavity in the stowed configuration.

According to a complementary feature, the third frequency range preferably extends entirely below 5 kHz, more preferably below 4.5 kHz.

It is found that the third frequency range thus allows clearly distinguishing a flow noise in the breathing cavity in the stowed configuration from a flow noise in the breathing cavity in the use configuration.

According to another feature, the communication assembly further comprises a storage box configured to receive the breathing mask in the stowed configuration.

Thus, the flow noise in the breathing cavity in the stowed configuration has less variation due to the environment of the breathing cavity, which improves the reliability of identifying that the sound signal corresponds to the flow of the breathing gas in the breathing cavity in the stowed configuration.

According to a complementary feature, preferably, the third frequency range is centred (the middle of the third frequency range is located) between 2,500 Hz and 3,500 Hz.

It is found that placing the middle of the third frequency range between 2,500 Hz and 3,500 Hz is favourable for the obtainment of a good discrimination of the flow noise of the breathing gas in the breathing cavity in the stowed configuration with respect on the one hand to a vocal sound and on the other to a flow noise of the breathing gas in the breathing cavity in the use configuration.

According to another feature, preferably, the third frequency range extends entirely above 1,000 Hz, more preferably above 1.5 kHz.

It is found that the third frequency range thus allows clearly distinguishing a flow noise in the breathing cavity in the stowed configuration to from a vocal sound.

According to an alternative feature, the first frequency range and the third frequency range overlap.

In the case where the distinction between a flow noise in the breathing cavity in the stowed configuration and a vocal sound is not essential, this feature may be advantageous.

According to a complementary feature, the first frequency range and the third frequency range are identical and the first level range and the third level range are identical.

Thus, the detection of a vocal sound and a flow noise of the breathing gas in the breathing cavity in the stowed configuration is performed simultaneously, indistinctly. Consequently, the communication assembly is simpler.

According to an alternative feature, preferably, the sound monitoring system comprises a third sound monitor distinct from the second sound monitor, the third sound monitor being configured to monitor the sound signal, detect the third sound intensity in the third frequency range and analyse the third sound intensity to determine whether the third sound intensity is within the third level range determined to detect flow noise in the breathing cavity in the stowed configuration, the third frequency range being distinct from the second frequency range.

Thus, the detection of a vocal sound is distinct from the detection of a flow noise in the breathing cavity in the stowed configuration, which allows for a better detection and a better discrimination with respect to a flow noise in the breathing cavity in the use configuration.

According to a complementary feature, the third sound monitor is preferably disposed on a microphone circuit board necessary for the operation of the microphone.

Thus, the characteristics of the third sound monitor can be modified by replacing a module comprising the microphone and the microphone circuit board.

Still complementarily, the microphone circuit board carries the first sound monitor, the third sound monitor and a portion of the controller returning intermediate information as to the selection of the operating mode of the attenuation device.

According to an alternative feature, the communication assembly comprises a microphone circuit board and the first sound monitor, the second sound monitor and the third sound monitor are disposed on a monitoring circuit board distinct from the microphone circuit board.

Thus, an existing communication assembly can be improved to avoid interferences due to oxygen flow noise in communications, while allowing for an easy verification of proper operation, by adding the monitoring circuit board.

According to another feature in accordance with the present disclosure, preferably the communication assembly further comprises a band-pass filter for filtering sound signals having a frequency outside a major voice frequency band, said band-pass filter being disposed between the attenuation device and the transmitter.

Thus, the communication assembly allows eliminating parasitic noises captured at the same time as the voice of the user, without having any major adverse effect on a good understanding of the voice of the user by the control tower or the other crew member.

According to a complementary feature, preferably the band-pass filter has a bandwidth including (all of) the frequency range comprised between 500 Hz and 1,500 Hz, preferably the band-pass filter has a bandwidth including (all of) the frequency range comprised between 300 and 3,000 Hz.

According to a complementary or alternative feature, the band-pass filter preferably cuts off at least the frequencies lower than 100 Hz and at least the frequencies higher than 5,000 Hz.

In various embodiments of the communication assembly, one could possibly resort to either one of the following arrangements:

- in the first mode, the attenuation device cuts off the entire sound signal;
- the controller is configured to always make the attenuation device operate in the second mode when the first sound intensity analysed by the first sound monitor is not within the first determined level range;
- the controller is configured to make the attenuation device operate in the second mode when:
  - the second sound intensity analysed by the second sound monitor is within the second determined level range, or
  - when the third sound intensity is within the third determined level range;
- the controller is configured to operate the attenuation device in the first mode only when:
  - the first sound intensity analysed by the first sound monitor is within the first determined level range,
  - the second sound intensity analysed by the second sound monitor is not within the second determined level range, and
  - the third sound intensity is not within the third determined level range;
- the first frequency range extends (entirely) above 10 kHz, preferably (entirely) above 30 kHz;
- the second frequency range extends (entirely) below 1,000 Hz, preferably (entirely) below 500 Hz, more preferably below 300 Hz;
- the second frequency range extends (entirely) above 100 Hz, preferably (entirely) above 130 Hz;
- each of the first sound monitor, the second sound monitor and the third sound monitor monitors the first electrical signal to monitor the sound signal;
- the breathing mask further comprises a holding harness attached to the body of the breathing mask.

An aircraft equipped with the communication assembly is also provided.

A method is proposed for avoiding interferences due to oxygen flow noise in communications between a user, an aircrew member, and another aircrew member or between the user and a tower control. In this method, a communication assembly comprises a breathing mask, a microphone and a test button, the breathing mask including a body and a regulator, the body of the breathing mask having a face shell, said face shell having a breathing cavity, the regulator supplying the breathing cavity during inhalation by the user, the microphone being mounted on the body of the breathing mask and being configured to capture a sound signal in the breathing cavity and to transmit a first electrical signal corresponding to the captured sound signal, the test button allowing supplying the breathing cavity with breathing gas when the communication assembly is in a stowed configuration in which the breathing cavity is not in contact with the face of the user, an attenuation device being configured to receive the first electrical signal, the method comprising:

placing the breathing mask in a use configuration in which the face shell is applied on the face of the user, the breathing cavity being delimited by said face shell and by the face of the user or placing the face shell of the breathing mask in the stowed configuration and actuate the test button, monitoring, in a first frequency range, a first sound intensity of the sound signal captured by the microphone, analysing the first sound intensity and determining whether the first sound intensity is within a first determined level range to detect a flow noise through the breathing cavity during inhalation by the user in the use configuration;

monitoring, in a second frequency range, a second sound intensity of the sound signal captured by the microphone, the second frequency range being distinct from the first frequency range, analysing the second sound intensity and determining whether the second sound intensity is in a second determined level range to detect a vocal sound, monitoring, in a third frequency range, a third sound intensity of the sound signal captured by the microphone, the third frequency range being distinct from the first frequency range and analysing the third sound intensity to determine whether the third sound intensity is within a third determined level range to detect a flow noise in the breathing cavity in the stowed configuration, attenuating at least one central frequency band of the first electrical signal to generate an output signal, the central frequency band of the first electrical signal corresponding to a frequency range of the sound signal extending between 500 Hz and 1,500 Hertz when the first sound intensity analysed by a first sound monitor is within the first determined level range and when the second sound intensity analysed by a second sound monitor is not within the second determined level range and the third sound intensity is not within the third level range, not attenuating the central frequency band of the first electrical signal to generate the output signal, when the second sound intensity analysed by the second sound monitor is within the second determined level range, and transmitting the output signal to another crew member or an emitter antenna.

BRIEF DESCRIPTION OF THE FIGURES

Other features and advantages will become apparent in the following detailed description, with reference to the appended drawings wherein.

DETAILED DESCRIPTION OF THE DISCLOSURE

Figure 1:
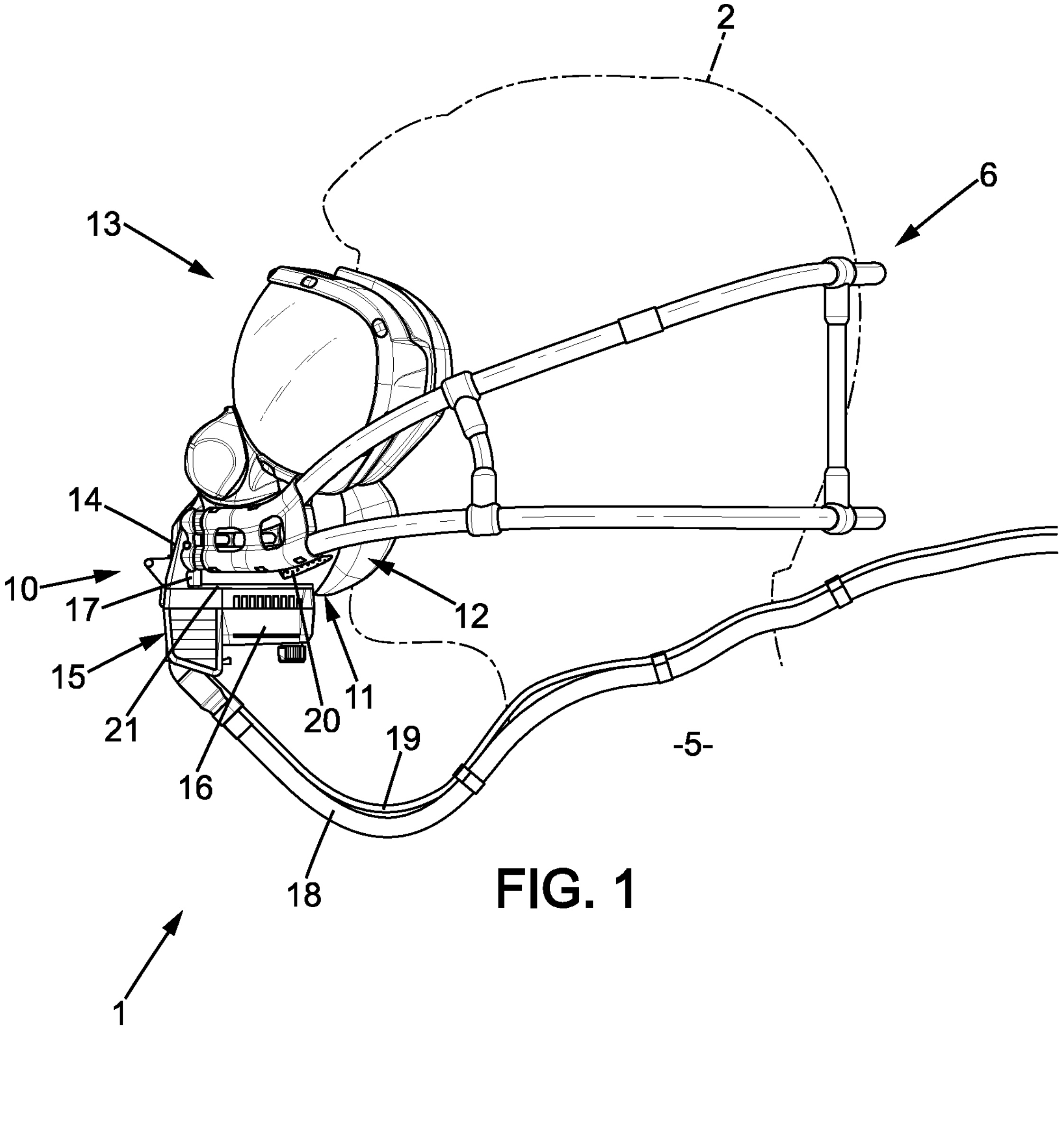
FIG. 1 is a schematic view of a communication assembly in a use configuration, the communication device comprising a breathing mask, a storage box equipped with a test button and a microphone assembly.
Figure 2:
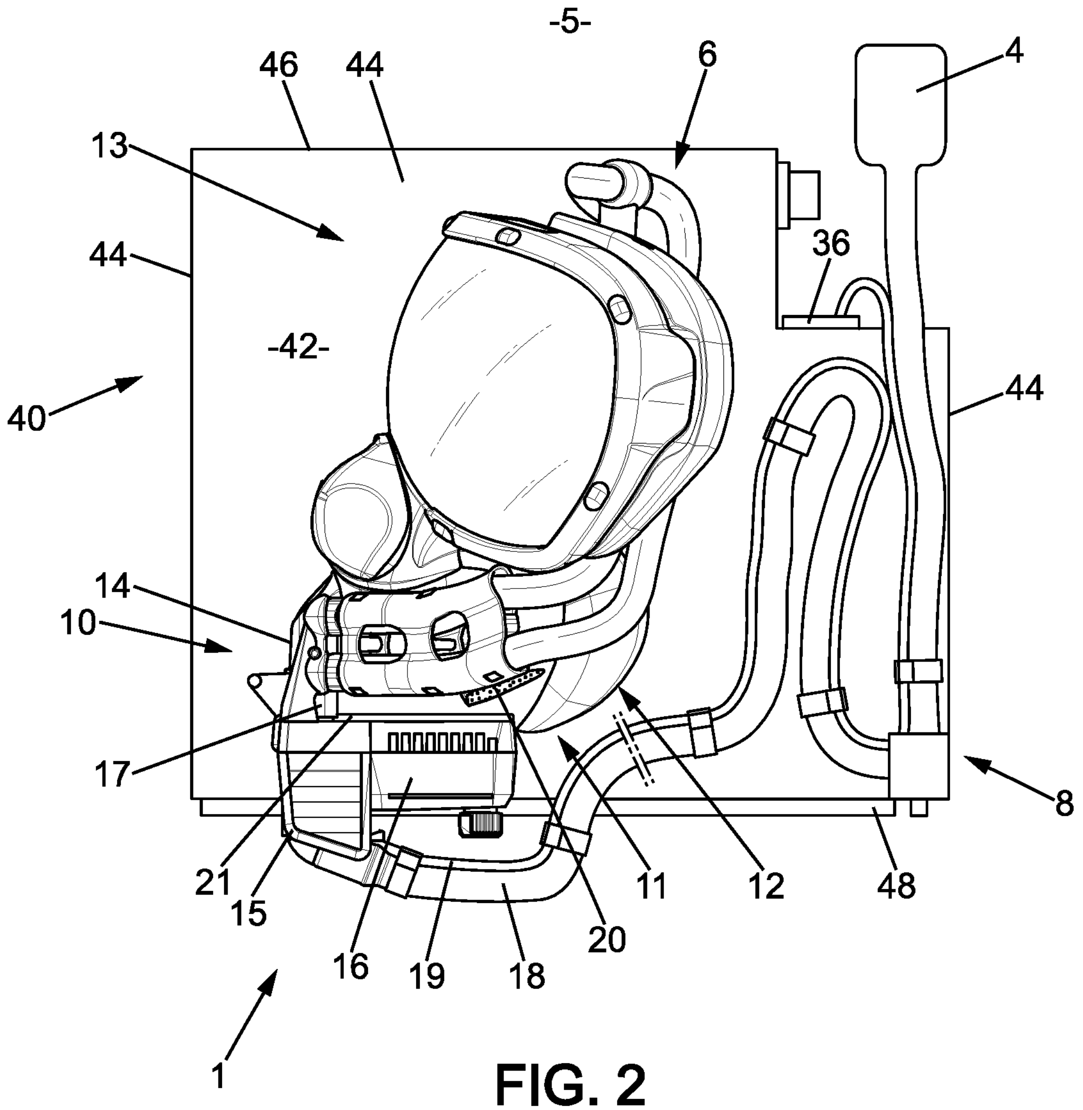
FIG. 2 is a schematic view of the communication assembly in a stowed configuration.
Figure 3:
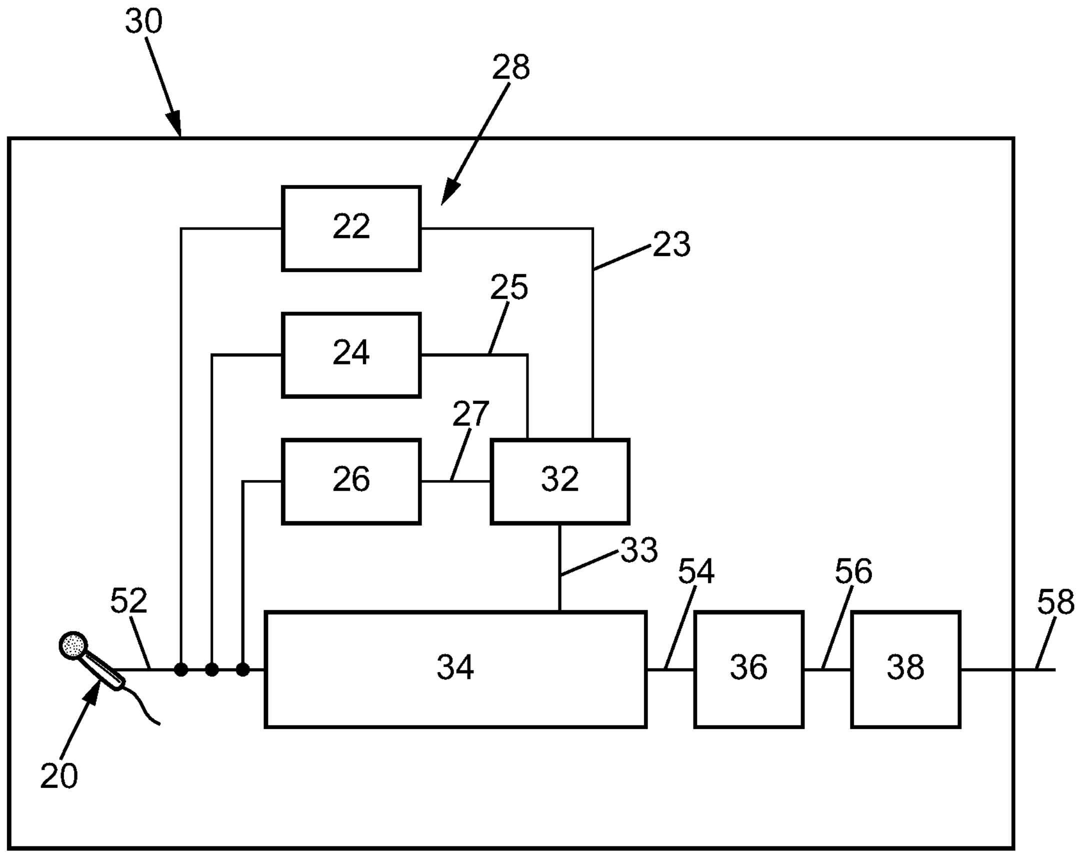
FIG. 3 schematically represents the microphone assembly comprising a microphone transmitting a first electrical signal.

FIGS. 1 and 2 illustrate a communication assembly 1 disposed in an aircraft cabin 5. The communication assembly 1 essentially comprises a breathing mask 10, an oxygen source 4, a storage box 40, a test button 8 and a microphone assembly 30. The microphone assembly 30 comprises a microphone 20, a sound monitoring system 28, a controller 32, an attenuation device 34 and a transmitter 38.

The breathing mask 10 is intended to be used by a user 2, generally a crew member piloting the aircraft. The breathing mask 10 comprises a body 14, a harness 6, a goggle 13 and a regulator 16. The body 14 includes a face shell 11 having a breathing cavity 12. The face shell 11 has a peripheral edge coming into contact with the face of the user 2, around the mouth and the nose of the user, in the use configuration illustrated in FIG. 1. The peripheral edge is generally covered with foam or a similar flexible material, in order to be applied in a substantially sealed manner on the face of the user 2. In the use configuration, the breathing cavity 12 is substantially close delimited by the face shell 11 and the face of the user 2. The user inhales and exhales in the breathing cavity 12.

In the illustrated embodiment, the face shell 11 is of the oronasal type. The goggle 13 is optional and removably mounted on the face shell 11. The goggle 13 comprises a secondary shell extending around the eyes and a transparent screen disposed opposite the eyes. The secondary shell defines a secondary cavity. Alternatively, the face shell could be of the so-called full-face type and extend around the mouth, the nose and the eyes forming a single cavity.

The harness 6 is connected to the body 14 and extends around the head of the user 2. In the use configuration, the harness 6 holds the face shell 11 applied on the face of the user 2. In the illustrated embodiment, the harness 6 is formed by two expandable tubes during pressurised inflation thereof. The tubes are held on the body 14 at their ends.

The regulator 16 is rigidly mounted on the body 14. The regulator has an inlet orifice 15 and an outlet orifice 17. The inlet orifice 15 is connected to an oxygen source 4 by a flexible hose 18. The outlet orifice 17 is in communication with the breathing cavity 12. As is well known, the regulator has several operating modes including a so-called normal mode, a so-called 100% oxygen mode and a so-called emergency mode. In the 100% oxygen mode, the regulator 16 supplies the breathing cavity 12 with breathing gas consisting solely of the gas coming from the oxygen source 4. The supply is performed on demand, in other words when the user 2 inhales, the user generates a slight depression in the breathing cavity 12 with respect to the ambient pressure in the cabin 5 and the regulator supplies the breathing cavity 12 until the pressure in to the breathing cavity reaches ambient pressure. In the normal mode, the regulator 16 supplies the breathing cavity 12 with a breathing gas consisting of a mixture of oxygen coming from the oxygen source and ambient air, the oxygen content of the breathing gas increasing when the ambient pressure decreases, the pressure in the breathing cavity 12 being maintained substantially equal to the ambient pressure. In the emergency mode, the regulator 16 supplies the breathing cavity 12 with breathing gas consisting of the gas coming from the oxygen source 4 and a slight overpressure is maintained in the breathing cavity 12 with respect to the ambient pressure.

Oxygen is stored under pressure in the oxygen source 4 or produced under pressure in the oxygen source 4. The gas supplied by the oxygen source 4 preferably comprises at least 95% oxygen, preferably at least 99% oxygen.

The breathing mask 10 also enables the gas exhaled by the user 2 in the breathing cavity 12 to escape. Preferably, the regulator 16 comprises a valve opening by an overpressure in the breathing cavity 12 to enable the gases exhaled by the user 2 to be evacuated in ambient air.

The storage box 40 has a storage space 42 in which the breathing mask 10 is received in the stowed configuration illustrated in FIG. 2. In the illustrated embodiment, the storage box 40 comprises four lateral walls 44, a bottom wall 46 and doors 48 delimiting the storage space 42. The storage box 40 is metallic. The storage box 40 has an access opening enabling the insertion of the breathing mask 10 into the storage space 42, or on the contrary removing the breathing mask from the storage box 42. The doors 48 are disposed opposite to the bottom wall 46. The doors 48 substantially block the access opening when they are closed and clear the access opening when they are open. In the stowed configuration, the regulator 16 is in the emergency mode which is the most protective for the user. In general, the storage box 40 is equipped with a supply valve (not represented) which is closed when the doors 48 are closed so as to prevent oxygen from escaping through the breathing cavity 12. The supply valve opens when the doors 48 are opened or a similar means allows opening the supply valve automatically when the breathing mask is removed from the storage box 40.

The test button 8 allows opening the supply valve while keeping the communication assembly in the stowed configuration and the doors 48 closed, in particular while keeping the breathing mask 10 in the storage space 42 (and the doors 48 closed). In the embodiment, the test button 8 is mounted on the storage box 40 proximate to the access opening.

The microphone 20 is mounted on the body 14, captures the sound signal in the breathing cavity 12 and converts the sound signal into a first electrical signal 52.

The attenuation device 34 receives the first electrical signal 52 from the microphone and transmits a second electrical signal 54. The attenuation device 34 comprises at least one first (operating) mode and one second (operating) mode. Preferably, the first mode is an active mode and the second mode is an inactive mode. Advantageously, the second mode is of the "pass-through" type in which the attenuation device 34 does not modify the first electrical signal 52 coming from the microphone 30, so that the second electrical signal 54 is identical to the first electrical signal 52. At the very least, in the first mode, a central frequency band is not attenuated. The central frequency band extends between 500 Hz and 1,500 Hz. In the first mode, the attenuation device 34 reduces the sound intensity of the first electrical signal 52 at least by one half, at least the central frequency band. Preferably, the attenuation device 34 cuts off the first electrical signal 52, at least the central frequency band. More preferably, in the first mode, the attenuation device 32 acts over the entire range of audible sound frequencies and cuts off the first electrical signal. In one embodiment, the attenuation device 34 may be a switch, the first mode consisting in cutting off the first electrical signal 52 and the second mode consisting in transmitting the first electrical signal 52 without modifying it. In an alternative embodiment, the attenuation device 34 may comprise an electronic component or software designed to reduce the intensity of the first electrical signal in the first mode.

In the illustrated embodiment, the second electrical signal 54 is received by a band-pass filter 36 which is optional. The band-pass filter 36 transmits a third electrical signal 56 to the transmitter 38. Hence, the band-pass filter 36 is to disposed between the attenuation device 34 and the transmitter 38. The band-pass filter 36 has a bandwidth preferably included in a major voice frequency range, the major voice frequency range extending between 300 Hz and 3,500 Hz, preferably between 300 Hz and 3,000 Hz. Thus, when the attenuation device 34 is in the second mode, the parasitic noises outside the major voice frequency range are eliminated by the band-pass filter 36.

The frequency range of a voice is essentially comprised between 300 Hz to 3,000 Hz. In telephony, the transmitted frequency range generally extends between 300 Hz and 3,400 Hz. 99% of the power of a voice is found at a frequency lower than 3,000 Hz. Consequently, the band-pass filter 36 essentially excludes the parasitic noises, not voices.

In the illustrated embodiment, the transmitter 38 emits an output signal 58 towards other crew members and/or towards the control tower, preferably via the audio system of the aircraft.

In the illustrated embodiment, the sound monitoring system 28 comprises a first sound monitor 22, a second sound monitor 24, and a third sound monitor 26. The first sound monitor 22, the second sound monitor 24 and the third sound monitor 26 are connected in parallel to the output of the microphone 20. More specifically, the first sound monitor 22, the second sound monitor 24 and the third sound monitor 26 receive the first electrical signal 52.

The first sound monitor 22 monitors a first frequency range in order to determine whether the first electrical signal 52 corresponds to a flow noise through the breathing cavity 12 during inhalation by the user 2 while the breathing mask 10 is in the use configuration. In other words, the first frequency range is selected so as to achieve a satisfactory discrimination in particular between on the one hand a flow noise of the pressurised breathing gas in the breathing cavity 12 in the use configuration and on the other hand a vocal sound or a flow noise of the pressurised breathing gas in the breathing cavity 12 in the stowed configuration. Other noises can be captured by the microphone in particular a flow noise from the breathing cavity 12 towards the ambient air of the cabin 5 when the user exhales. Yet, in the illustrated embodiment, these other noises are not discriminated, given that their overall sound level has turned out to be low enough not to substantially interfere with good understanding of the voices.

In the use configuration, the breathing cavity 12 is substantially closed (the breathing gas flows through the breathing cavity 12 towards the lungs of the user 2), delimited on the one hand by the face shell 11 and on the other hand by the face of the user 2. In the stowed configuration, the breathing cavity 12 is open, so that the breathing gas flowing in the breathing cavity 12 could escape in the ambient air of the cabin 5.

Figure 4:
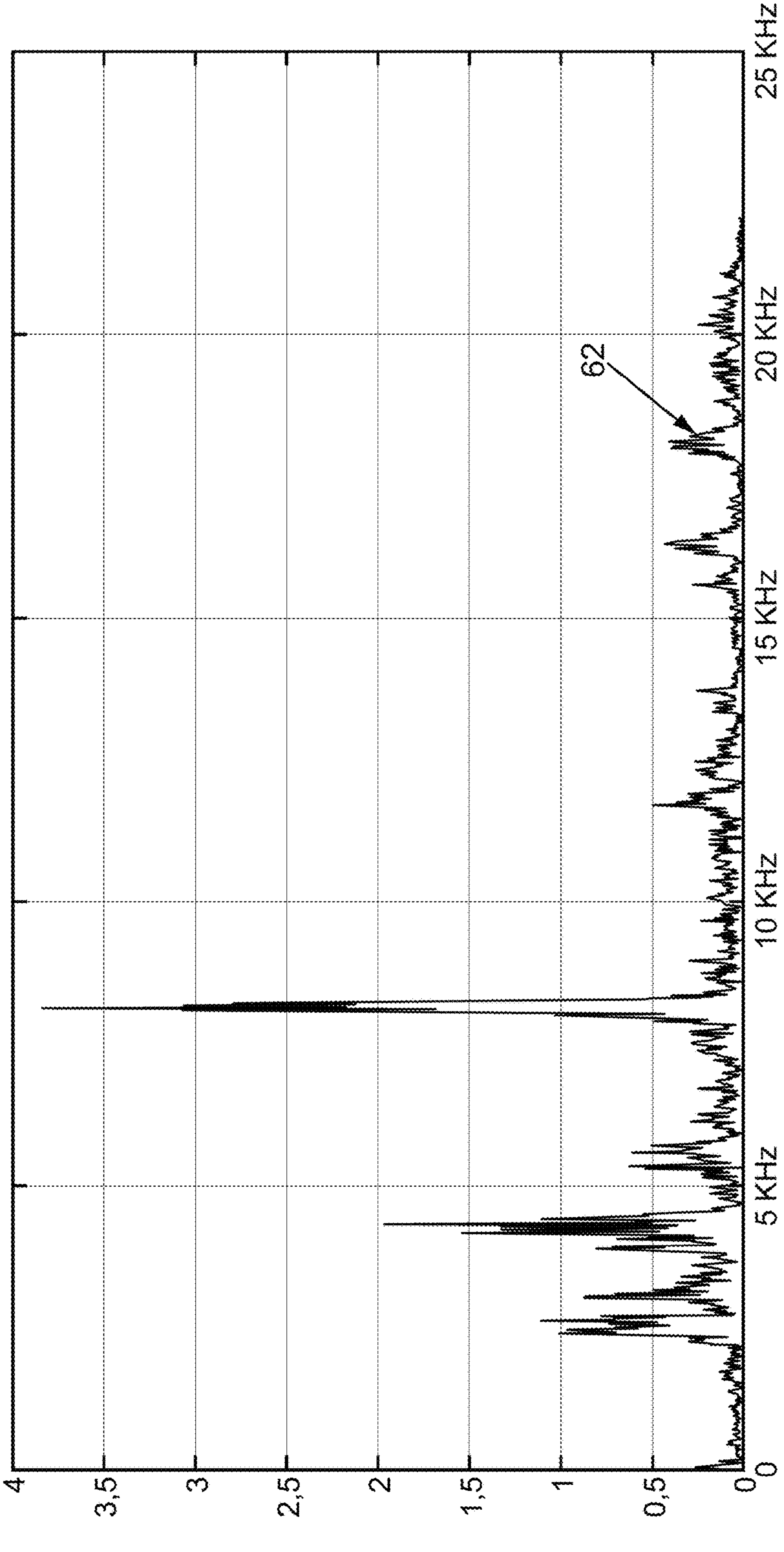
FIG. 4 illustrates a spectral analysis of the first electrical signal in a use configuration.

FIG. 4 illustrates a first curve 62 representing the sound intensity of a flow noise through the breathing cavity 12 in the use configuration captured by the microphone 20 as a function of frequency. In other words, the first curve 61 is a frequency representation of the first electrical signal 52 during inhalation by the user 2.

Figure 5:
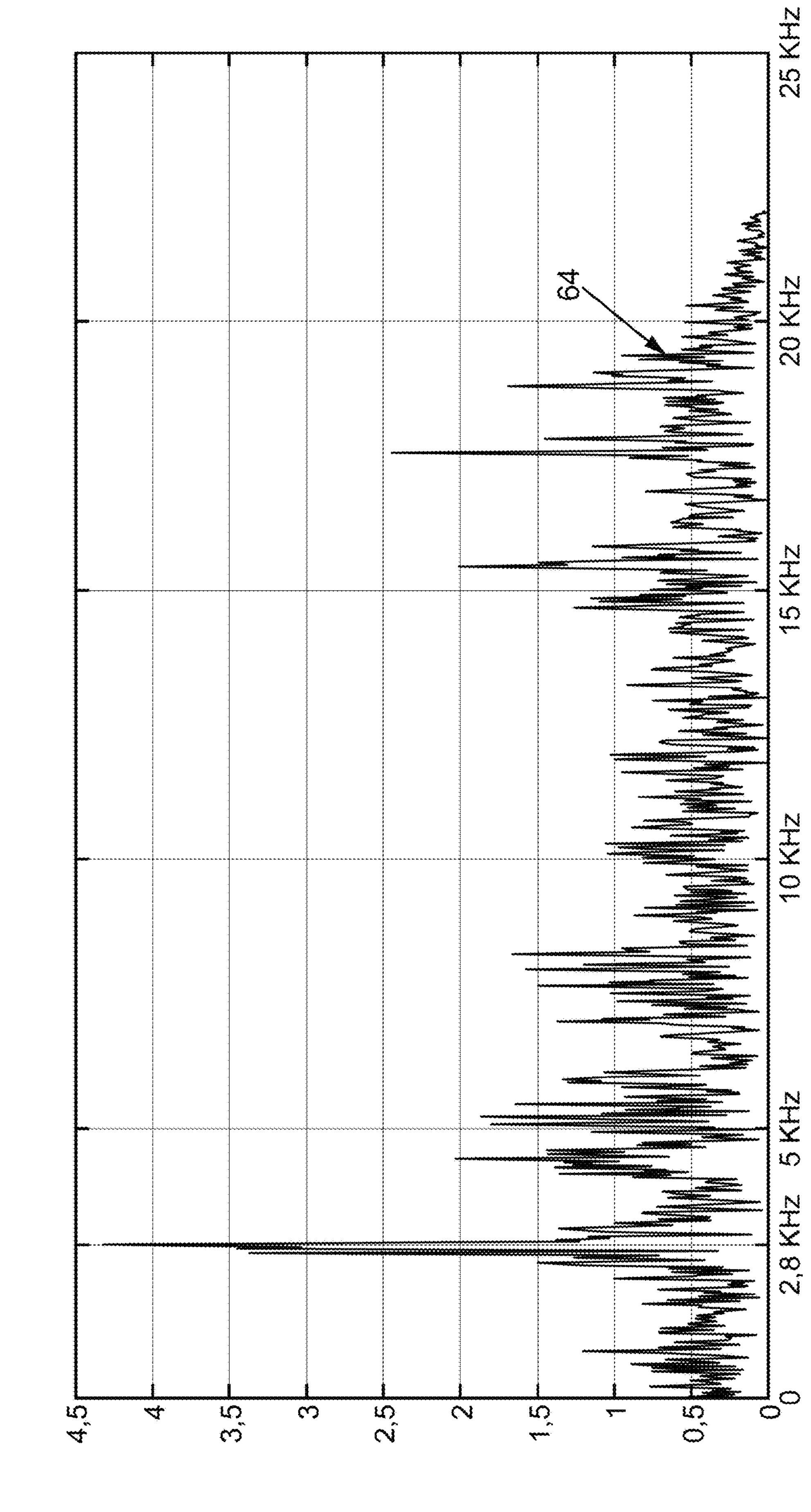
FIG. 5 illustrates a spectral analysis of the first electrical signal in a stowed configuration.

FIG. 5 illustrates a second curve 64 representing the sound intensity of a flow noise through the breathing cavity 12 in the stowed configuration as a function of frequency. In other words, the second curve 62 is a frequency representation of the first electrical signal 52 during a test with the breathing mask 10 inside the storage box 40.

The difference between the first curve 62 illustrated in FIG. 4 and the second curve 64 illustrated in FIG. 5 appears in particular due to the fact that the breathing gas flows in the closed breathing cavity 12 versus the breathing cavity 12 is open to ambient air and the fact that the face of the user has absorption characteristics of the different sounds of the storage box 40 or of ambient air.

A spectral analysis of the first curve 62 and of the second curve 64 shows that the flow noise of the breathing gas in the breathing cavity 12 is close to a white noise both in the use configuration and in the stowed configuration, i.e. the flow noise of the breathing gas in the breathing cavity 12 has approximately the same intensity over a wide frequency range. Yet, differences appear between the first curve 62 and the second curve 64 appear. In particular, the analysis shows a high intensity component of the first curve 62 above 10 kHz and more particularly 30 kHz.

When the first sound monitor 22 detects that the first electrical signal 52 has, in the first frequency range, a first intensity which is comprised within a first determined level range, the first sound monitor 22 sends a first message 23 to the controller 32 which corresponds to the detection of a flow noise through the breathing cavity 12 in the use configuration. Otherwise, the first message 23 sent by the first sound monitor 22 to the controller 32 corresponds to an absence of detection of flow noise through the breathing cavity 12 in the use configuration. Hence, the first message 23 sent to the controller 32 is binary.

Consequently, if the first sound monitor 22 detects a sound with frequencies higher than 10 kHz and with an intensity higher than 60 dBa in this frequency range, it can be deduced that the first electrical signal 52 corresponds to the noise of the breathing gas inhaled by user 2 in the use configuration.

The second sound monitor 24 monitors a second frequency range in order to determine whether the first electrical signal 52 corresponds to a vocal sound. In other words, the second frequency range is selected so as to achieve a satisfactory discrimination in particular between on the one hand a vocal sound and on the other hand or a flow noise of pressurised oxygen in the breathing cavity 12 in the use configuration or in the stowed configuration. Herein again, other noises can be captured by the microphone 20. By vocal sound, it should be understood a human voice, in particular the voice of the user 2.

When the second sound monitor 24 detects that the first electrical signal 52 has in the second frequency range a second intensity that is included in a second determined level range, the second sound monitor 24 sends a second message 25 to the controller 32 which corresponds to the detection of a vocal sound. Otherwise, the second message 25 sent by the second sound monitor 24 to the controller 32 corresponds to an absence of detection of vocal sound. The second message 25 sent to the controller 32 is also binary.

The second monitor 24 is configured to detect a sound in a second frequency range characteristic of a vocal sound. Preferably, the second frequency range extends below 1,000 Hz, for example below 500 Hz and more preferably between 130 Hz and 230 Hz. Alternatively, the second frequency range could be centred on 180 Hz more or less 25 Hz and have an amplitude comprised between 50 Hz and 250 Hz.

In the illustrated embodiment, the second intensity extends above a second level, for example above 60 dBa.

The third sound monitor 26 monitors a third frequency range in order to determine whether the first electrical signal 52 corresponds to a flow noise through the breathing cavity 12 when the breathing mask 10 is in the stowed configuration. In other words, the third frequency range is selected so as to achieve satisfactory discrimination in particular between, on the one hand, a flow noise of pressurised breathing gas in the breathing cavity 12 in the stowed configuration and, on the other hand, a vocal sound or a flow noise of pressurised breathing gas in the breathing cavity 12 in the use configuration. The other noises that can be captured by the microphone 20 are not discriminated in the illustrated embodiment.

It has been found that to perform a good discrimination between a vocal sound and a breathing gas flow noise in the breathing cavity 12 in the stowed configuration, the third frequency range is preferably selected above 1,000 Hz, more preferably above 1,500 Hz. Furthermore, the third frequency range should preferably extend (at least in part) above 2,000 Hz, more preferably above 2,500 Hz.

Furthermore, to perform a good discrimination between a breathing gas flow noise in the breathing cavity 12 in the stowed configuration and a breathing gas flow noise in the breathing cavity 12 in the use configuration, the third frequency range is preferably selected (entirely) below 5,000 Hz, more preferably below 4,500 Hz.

Furthermore, it has been found that when the breathing mask is in the storage box 40, a peak of intensity appears in a range from about 2,500 Hz to 3,500 Hz depending on the characteristics of the storage box 40. Consequently, the third frequency range is preferably centred between 2,500 Hz and 3,500 Hz and the width of the second frequency range is preferably lower than 2,000 Hz, more preferably lower than 500 Hz.

In the illustrated embodiment, preferably the third frequency range is centred on 2,800 Hz, and extends 200 Hz on either side, in other words, the second frequency range extends between 2,600 Hz and 3,000 Hz.

Preferably, the third frequency range monitored by the third sound monitor 26 is determined by a filter of an order greater than or equal to 2, preferably greater than or equal to 4.

In the illustrated embodiment, the third intensity extends above a third level, for example above 60 dBa.

The controller 32 receives the first message 23 from the first sound monitor 22, the second message 25 from the second sound monitor 24 and the third message 27 from the third sound monitor 26.

When the second message 25 corresponds to the detection of vocal sound, the controller 32 sends a command message 33 to the attenuation device 32 to place it in the second mode, regardless of the first message 23 and the third message 27. In other words, the second message 25 takes priority over the first message 23 and the third message 27.

When the third message 27 corresponds to the detection of breathing gas flow noise in the breathing cavity 12 in the stowed configuration, the controller 32 sends a command message 33 to the attenuation device 32 to set it in the second mode, regardless of the first message 23. In other words, the third message 27 takes priority over the first message 23. Thus, even though the first sound monitor 22 detects a breathing gas flow noise in the breathing cavity 12 in the flow configuration, while the communication assembly is actually in the stowed configuration, the communication assembly 1 can be tested (sound is not attenuated). Alternatively, provision could be made for the first message 23 to take priority over the third message 27, in other words when the second message 25 corresponds to the absence of detection of vocal sound and the first message corresponds to the detection of breathing gas flow noise in the breathing cavity 12, the controller sets the attenuation device 34 in the first mode regardless of the third message 27.

When the first message 23 corresponds to the detection of breathing gas flow noise in the breathing cavity 12 in a use configuration and the second message 25 corresponds to the absence of detection of vocal sound and the third message corresponds to the absence of detection of breathing gas flow noise in the breathing cavity 12 in a stowed configuration, the controller 32 sends a command message 33 to the attenuation device 32 to set it in the first mode.

When the first message 23 corresponds to the absence of detection of breathing gas flow noise in the breathing cavity 12 in a use configuration, the second message 25 corresponds to the absence of detection of vocal sound and the third message corresponds to the absence of detection of breathing gas flow noise in the breathing cavity 12 in a stowed configuration, the controller 32 sets the attenuation device 32 in the second mode. Nonetheless, alternatively, the controller 32 could send a command message 33 to the attenuation device 32 to set it in the first mode, if it were noticed that such a situation corresponds to another parasitic noise, such as exhalation by the user 2 through the breathing cavity 12.

The controller 2 can be configured to carry out logic tests in pairs between the first message 22, the second message 24 and the third message 26, the command message 33 being the result of the different logic tests. The microphone assembly 30 comprises a microphone circuit board 21 and a monitoring circuit board 35 connected by an electrical cable 19. The microphone circuit board 21 is disposed in the body 14 of the breathing mask 10. The monitoring circuit board 35 is disposed remotely from the breathing mask 10, in particular on the storage box 40 or another location in the cabin 5 of the aircraft. The attenuation device 34, the filter 36 and the transmitter 38 are disposed on the monitoring circuit board 35.

In one embodiment, controller 32 comprises a first logic unit and a second logic unit. The first logic unit carries out a test between the first message 23 and the third message 27, the result of which is tested by the second logic unit with the second message 25 to obtain the command message 33 sent to the attenuation device 32 according to one of the logics explained above. On the other hand, the first sound monitor 22, the third sound monitor 26 and the first logic unit are preferably disposed on the microphone circuit board 21, whereas the second sound monitor 24 and the second logic unit are disposed on the monitoring circuit board 35. Alternatively, all of the first sound monitor 22, the second sound monitor 24, the third sound monitor 26, the first logic unit and the second logic unit could be disposed on the monitoring circuit board 35.

In another embodiment, the first logic unit carries out a test between the first message 23 and the second message 25, the result of which is tested by the second logic unit with the third message 27 to obtain the command message 33 sent to the attenuation device.

Although the present disclosure has been illustrated and described in detail in the drawings and the preceding description, this illustration and this description should be considered as an illustrative and non-limiting example. For example, the microphone transmitting the first electrical signal 52 could be a second microphone to which the second sound monitor 24 is connected, the first sound monitor 22 being connected to a first microphone different from the second microphone and/or the third sound monitor 26 could be connected to a third microphone different from the second microphone, the different microphones being able to have different acoustic responses. Consequently, the first electrical signal 52 could in particular be different from the electrical signal received by the first sound monitor 22.

In particular, the second microphone could be selected so as to be particularly sensitive to voice signals and with little distortion within the voice bandwidth. The first microphone and/or the third microphone could be selected so as to obtain a response with a large bandwidth, but with a low distortion requirement.

The microphone circuit board 21 and/or the monitoring circuit board 35 may be in the form of a printed circuit board using discrete analog components such as a filter, operational amplifiers used to amplify the signals and compare them with predetermined levels, and logic components for controlling the behaviour of the board.

The microphone circuit board 21 and/or the monitoring circuit board 35 can be in the form of a digital board or a mixed analog/digital board, using software and a digital signal processor (DSP) to embed the above-described functions. For example, an analog-to-digital converter can convert the signals emitted by the microphone 20 into a stream of integers representative of the captured sounds. The integer stream is processed by a software-managed processor to analyse the characteristics of the captured sounds and determine the attenuation to be applied as explained hereinabove.

The invention claimed is:

1. A communication assembly for avoiding interferences due to oxygen flow noise in communications between a user, an aircrew member, and another aircrew member or between the user and a control tower, said communication assembly comprising:

a) a breathing mask including:
  - a body having a face shell having a breathing cavity, said face shell being adapted to be applied on a face of the user in a use configuration in which the breathing cavity is delimited by said face shell and by the face of the user, and
  - a regulator including an inlet orifice intended to be connected to an oxygen source and an outlet orifice delivering a breathing gas containing oxygen, the outlet orifice being in flow communication with the breathing cavity for supplying the breathing gas to the user in a flow through the breathing cavity during inhalation by the user, b) a test button for supplying the breathing cavity with breathing gas when the communication assembly is in a stowed configuration in which the breathing cavity is not in contact with the face of the user, c) a microphone mounted on the body of the breathing mask, the microphone being configured to capture a sound signal in the breathing cavity and transmit a first electrical signal corresponding to the captured sound signal, d) an attenuation device configured to receive the first electrical signal and operate in at least a first mode or a second mode and transmit a second electrical signal, wherein:
  - in the first mode, the attenuation device attenuates at least one central frequency band of the first electrical signal, said central frequency band corresponding to a frequency range of the sound signal extending between 500 Hz and 1,500 Hz, and
  - in the second mode, the attenuation device does not attenuate the central frequency band of the first electrical signal;

e) a sound monitoring system comprising:

a first sound monitor configured to monitor the sound signal, detect a first sound intensity in a first frequency range and analyse the first sound intensity to determine whether the first sound intensity is within a first determined level range to detect a flow noise through the breathing cavity during inhalation by the user in the use configuration, and a second sound monitor configured to monitor the sound signal, detect a second sound intensity in a second frequency range and analyse the second sound intensity to determine whether the second sound intensity is within a second determined level range to detect a vocal sound, the second frequency range being distinct from the first frequency range;

f) a controller configured to select the operating mode of the attenuation device, in order to make the attenuation device operate in:

the first mode when the first sound intensity analysed by the first sound monitor is within the first determined level range and when the second sound intensity analysed by the second sound monitor is not within the second determined level range, and the second mode when the second sound intensity analysed by the second sound monitor is within the second determined level range; and g) a transmitter disposed downstream of the attenuation device for transmitting an output signal to another crew member or an emitter antenna, wherein:

the sound monitoring system is configured to monitor the sound signal, detect a third sound intensity in a third frequency range and analyse the third sound intensity to determine whether the third sound intensity is within a third determined level range to detect a flow noise in the breathing cavity in the stowed configuration, the third frequency range being distinct from the first frequency range, and the controller is configured not to make the attenuation device operate in the first mode when the third sound intensity is within the third level range.

2. The communication assembly according to claim 1, wherein the third frequency range extends at least partially above 2,000 Hz.

3. The communication assembly according to claim 1, wherein the third frequency range extends at least partially above 2,500 Hz.

4. The communication assembly according to claim 1, wherein the third frequency range extends entirely below 5 kHz.

5. The communication assembly according to claim 1, wherein the third frequency range extends entirely below 4.5 kHz.

6. The communication assembly according to claim 1, wherein the communication assembly further comprises a storage box configured to receive the breathing mask in the stowed configuration.

7. The communication assembly according to claim 6, wherein the third frequency range is centred between 2,500 Hz and 3,500 Hz.

8. The communication assembly according to claim 1, wherein the third frequency range extends entirely above 1,000 Hz.

9. The communication assembly according to claim 1, wherein the third frequency range extends entirely above 1.5 kHz.

10. The communication assembly according to claim 1, wherein the sound monitoring system comprises a third sound monitor distinct from the second sound monitor, the third sound monitor being configured to monitor the sound signal, detect the third sound intensity in the third frequency range and analyse the third sound intensity to determine whether the third sound intensity is within the third level range determined to detect flow noise in the breathing cavity in the stowed configuration, the third frequency range being distinct from the second frequency range.

11. The communication assembly according to claim 1, wherein, in the first mode, the attenuation device silences all of the sound signal.

12. The communication assembly according to claim 11, wherein the controller is configured to make the attenuation device operate in the first mode only when:

the first sound intensity analysed by the first sound monitor is within the first determined level range, the second sound intensity analysed by the second sound monitor is not in the second determined level range, and the third sound intensity is not in the third determined level range.

13. An aircraft equipped with a communication assembly according to claim 1.

14. A method for avoiding interferences due to oxygen flow noise in communications between a user, an aircrew member, and another aircrew member or between the user and a tower control, wherein a communication assembly comprises a breathing mask, a microphone and a test button, the breathing mask including a body and a regulator, the body of the breathing mask having a face shell, said face shell having a breathing cavity, the regulator supplying the breathing cavity during inhalation by the user, the microphone being mounted on the body of the breathing mask and being configured to capture a sound signal in the breathing cavity and to transmit a first electrical signal corresponding to the captured sound signal, the test button allowing supplying the breathing cavity with breathing gas when the breathing mask is in a stowed configuration in which the breathing cavity is not in contact with the face of the user, an attenuation device being configured to receive the first electrical signal, the method comprising:

placing the breathing mask in a use configuration in which the face shell is applied on the face of the user, the breathing cavity being delimited by said face shell and by the face of the user or placing the face shell of the breathing mask in the stowed configuration and actuate the test button, monitoring, in a first frequency range, a first sound intensity of the sound signal captured by the microphone, analysing the first sound intensity and determining whether the first sound intensity is within a first determined level range to detect a flow noise through the breathing cavity during inhalation by the user in the use configuration, monitoring, in a second frequency range, a second sound intensity of the sound signal captured by the microphone, the second frequency range being distinct from the first frequency range, analysing the second sound intensity and determining whether the second sound intensity is in a second determined level range to detect a vocal sound, monitoring, in a third frequency range, a third sound intensity of the sound signal captured by the microphone, the third frequency range being distinct from the first frequency range and analysing the third sound intensity to determine whether the third sound intensity is within a third determined level range to detect a flow noise in the breathing cavity in the stowed configuration, attenuating at least a central frequency band of the first electrical signal to generate an output signal, the central frequency band of the first electrical signal corresponding to a frequency range of the sound signal extending between 500 Hz and 1,500 Hertz when the first sound intensity analysed by a first sound monitor is within the first determined level range and when the second sound intensity analysed by a second sound monitor is not within the second determined level range and the third sound intensity is not within the third level range, not attenuating the central frequency band of the first electrical signal to generate the output signal, when the second sound intensity analysed by the second sound monitor is within the second determined level range, and transmitting the output signal to another crew member or an emitter antenna.

* * * * *